April 9, 1929.  R. W. ANDREWS  1,708,654
FLUID SEPARATOR
Filed Dec. 5, 1925

INVENTOR:
Roger W. Andrews
BY
ATTORNEY.

Patented Apr. 9, 1929.

1,708,654

UNITED STATES PATENT OFFICE.

ROGER W. ANDREWS, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY.

FLUID SEPARATOR.

Application filed December 5, 1925. Serial No. 73,316.

Figure 1:
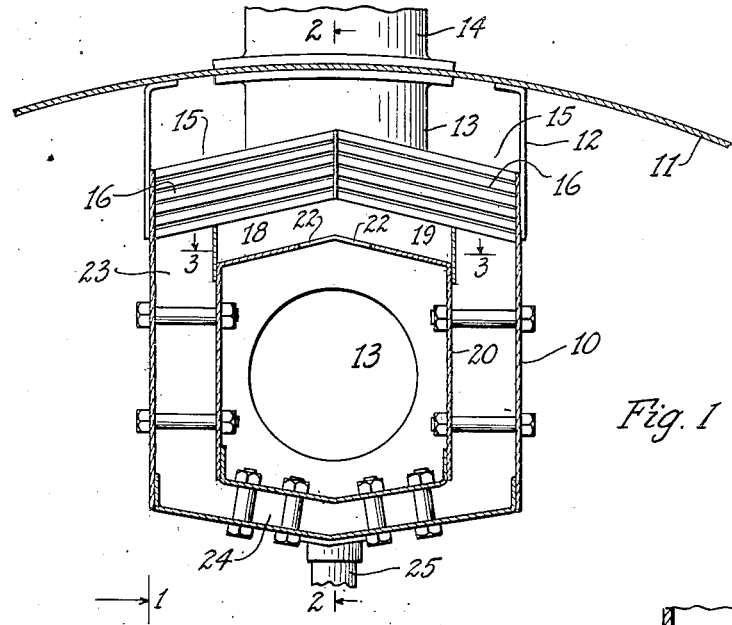
Figure 2:
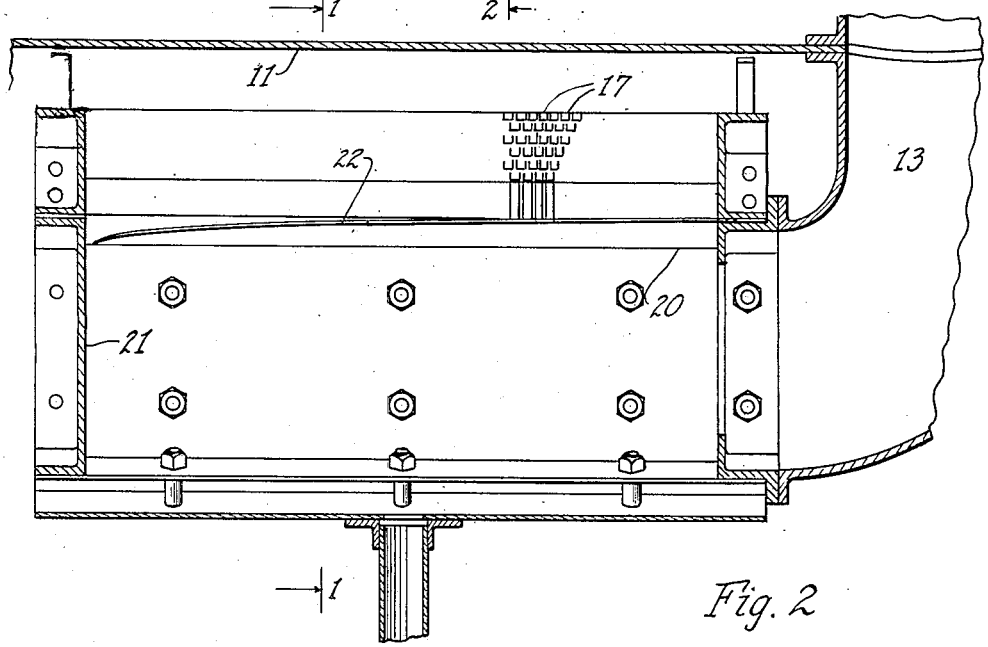
Figure 3:
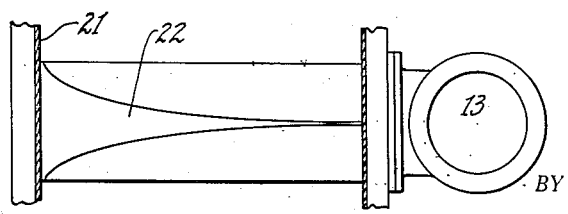

This invention relates to fluid separators or purifiers for separating liquids or other impurities from gases. The particular application of the separator which is illustrated and described in this specification is to steam boilers for drying and purifying the steam as it passes from the boiler to the steam main: but it is to be understood that the invention applies to various other uses. One of the objects of the invention is to provide a separator, the gas inlets of which are located on the upper side of the separator so that the gas, and particularly the steam in case of steam boilers, enters at the upper side, and is thus ordinarily drier than steam which enters the separator on the side of the apparatus. Another object is to provide for uniform flow of the steam through all portions of the purifying baffles of the separator. Other objects of the invention will be apparent from a consideration of the accompanying drawings and the following description thereof;

Of the drawings Fig. 1 is a transverse sectional view along the line 1—1 of Fig. 2; Fig. 2 is a longitudinal sectional view along the line 2—2 of Fig. 1; and Fig. 3 is a reduced plan view along the line 3—3 of Fig. 1.

The separator which I prefer comprises a casing 10 which is mounted in any suitable manner in a steam boiler 11. In this instance the separator is supported by hangers 12 in the upper steam space of the boiler. The separator has a steam outlet 13 communicating with the steam main 14 of the boiler system. It has steam inlets 15 in which are mounted steam purifying mechanism such as the baffles 16. These baffles may be of any suitable form. I prefer for the purpose in this instance the trough-shaped staggered baffles 17. These baffles are grouped into banks or cartons 18 and 19 with the troughs inclined, as indicated, so that, as the steam passes through the the baffles, the moisture and other impurities, in a well known manner, will be separated from the steam and will flow downwardly towards the lower ends of the baffles.

Within the casing 10 is a conduit 20, one end of which communicates with the outlet 13 and the other end of which is closed by an end plate 21. On the upper side of this conduit 20 is an inlet 22 which allows the steam, after passing through the baffles, to pass into the conduit 20 and out through the outlet 13 to the steam main. At the same time the moisture separated from the steam flows down to the ends of the baffles 16 and overflows into the passageways 23 and 24 and thence into the liquid outlet 25, where the liquid passes to wherever it may be desired.

It will thus be seen that the steam which is received into the separator must come from the upper portion of the steam space, as the sides and bottom of the separator are entirely closed, and thus the steam entering the separator carries with it a much less amount of moisture than would be the case if the steam entered on the sides of the separators. At the same time the moisture and the steam, after passing through the baffles are completely separated so that there is no opportunity for the steam to take up moisture in its passage through the separator and out to the steam mains. While one separator section only is shown it is understood that a plurality of sections may be used, being suitably connected end to end or otherwise.

I have set forth in my patent No. 1,570,985, issued to me January 26, 1926, that it is desirable to have the steam flow at a substantially uniform rate throughout all portions of the baffles. If the speed of the steam is too great the drying thereof and purifying will be more or less imperfect, and if the speed is too slow the capacity of the separator will be diminished. It is, therefore, desirable, in order to maintain the speed substantially uniform at all points through the baffles, to maintain the pressure drop substantially uniform through all portions of the baffles. With the separator illustrated herein, as the steam passes into the separator at the top, and flows from the sides towards the center of the top, as it enters the baffles, it is desirable to have it flow towards the center of the separator as it passes away from the baffles. Hence, I locate the slot 22 along the longitudinal central portion of the separator, and thus provide more uniform flow of the steam through the baffles. While the steam may pass into the baffles at all points, yet the pressure as it enters is somewhat less towards the longitudinal central portions of the baffles, and the back pressure on the lower sides of the cartons is correspondingly lower along the central portion because of the central inlet slot 22 of the conduit 20. It is to be understood, however, that the slot 22 may be placed elsewhere on the top or even on the sides of the conduit if desired.

As the steam passes out of the separator at one end, the speed of the steam through the baffles adjacent that end ordinarily will be higher than towards the other end of the separator, because the drop in pressure is greater at the outlet end of the separator. To offset this, and thus to provide for more uniform flow through the baffles, I provide means for retarding the flow more and more as the steam outlet 13 is approached. To this end in this instance I prefer to make the steam inlet 22 to the interior conduit 20 tapering, as indicated, with the narrow portion of the inlet slot adjacent the outlet end of the separator. The exact shape of the slot will depend upon the requirements to produce uniform flow throughout all portions of the baffles, but in a general way the sides of the slot are curved somewhat as indicated in Fig. 3. These curves forming the sides of the slots, provide for a very narrow slot at the outlet end of the separator, and for an opening extending entirely across the top of the conduit at the other end of the separator.

I claim as my invention:

1. A fluid separator comprising a casing, said casing having a fluid inlet on its upper side, a fluid outlet in one end, and a fluid outlet in its bottom, said casing being otherwise closed, fluid purifying baffles mounted in said inlet, said baffles comprising elongated troughs, said troughs being inclined to the horizontal plane, an inner conduit mounted in said casing, the wall of said conduit having an elongated slot therein.

2. A fluid separator comprising a casing, said casing having a fluid purifying means on its upper side, a fluid outlet fixed to said casing, and a conduit mounted in said casing and communicating with said outlet, said conduit having a fluid inlet on its upper wall beneath said purifying means, said inlet being tapering.

3. A fluid separator comprising a casing, said casing having a fluid purifying means on its upper side, a fluid outlet fixed to said casing, and a conduit mounted in said casing and communicating with said outlet, said conduit having a fluid inlet on its upper wall beneath said purifying means, said inlet being tapering, and being extremely narrow adjacent the outlet end of the separator and extending substantially across the entire upper wall of the conduit adjacent the other end of the separator.

4. A fluid separator comprising a casing, said casing having a fluid purifying means on its upper side, a fluid outlet fixed to said casing, and a conduit mounted in said casing and communicating with said outlet, said conduit having a fluid inlet on its upper wall beneath said purifying means, and positioned in the central portion of said wall, one of the edges of said slot forming a curve.

5. A fluid separator comprising an elongated casing, said casing being open on its upper side, but having mounted on its upper side a plurality of elongated baffles extending from a longitudinal central line in opposite directions and to the respective sides of the casing and slanting downwards from said central line, an inner conduit mounted in said casing beneath said baffles and extending from one end to the other of the casing, a fluid outlet fixed to one end of said casing and communicating with one end of said conduit, a fluid outlet fixed to the lower side of said casing and communicating with the space between the bottom of said casing and said inner conduit, the said conduit having a fluid inlet in its top wall, said inlet comprising a slot extending from one end to the other of said wall and positioned along the central portion of said top and being very narrow at the outlet end of said conduit and extending substantially across the entire top of said conduit at the other end thereof.

6. A fluid separator comprising a casing having an elongated horizontal inner conduit, means mounted in the top of said casing for purifying the fluid, and a fluid outlet communicating with said inner conduit, said conduit having an elongated slot in its wall adjacent said purifying means.

7. A fluid separator comprising a casing having an inner conduit, means mounted in the top of said casing for purifying the fluid, and a fluid outlet communicating with said inner conduit, said conduit having a tapering slot in its wall.

8. A fluid separator comprising a casing, said casing having fluid purifying means on its upper side, a fluid outlet fixed to said casing, and a conduit mounted in said casing and communicating with said outlet, said conduit having a fluid inlet on its upper wall beneath said purifying means, said inlet being tapering, and being extremely narrow adjacent the outlet of the conduit, and extending therefrom to a point adjacent a remote end of the conduit.

9. A gas separator comprising a casing having an open top and an inner conduit, means for purifying gas mounted in the top of the casing, a gas outlet communicating with said inner conduit, the wall of said conduit being arranged to direct the flow of gas from said purifying means into said conduit, and comprising an elongated plate mounted between said purifying means and said conduit, one edge of said plate being spaced away from the other portions of the wall.

10. A gas separator comprising a casing having an open top and an inner conduit, means for purifying gas mounted in the top of the casing, a gas outlet communicating with said inner conduit, the wall of said conduit comprising means for directing the flow of gas from said purifying means into said conduit, said directing means comprising an elongated plate mounted between said purifying means and said conduit, the edges of said plate converging towards one end.

In testimony whereof, I hereunto set my hand.

ROGER W. ANDREWS.